Sept. 8, 1953

S. P. CLURMAN 2,651,205

LOCKING AND RESETTING MEANS FOR GYROSCOPES

Filed Dec. 29, 1951

INVENTOR
STANLEY CLURMAN
BY
Herbert H. Thompson
his ATTORNEY.

Patented Sept. 8, 1953

2,651,205

UNITED STATES PATENT OFFICE 2,651,205

LOCKING AND RESETTING MEANS FOR GYROSCOPES

Stanley P. Clurman, Brooklyn, N. Y., assignor to The Sperry Corporation, a corporation of Delaware Application December 29, 1951, Serial No. 264,106

7 Claims. (Cl. 74—5.1)

This invention relates to means for positioning a rotatable member in a predetermined position and more particularly to means for caging and resetting gyroscopes.

It is frequently desirable to fix a rotatable member in a predetermined position. For instance, in the case of aircraft gyroscope, it is sometimes desirable to lock or cage the gyroscope rotor before engaging in erratic maneuvers in order to protect the delicate mechanism from possible damage. It is also desirable to lock the gyro in a predetermined position until it is brought up to speed. For instance, if it is locked in a reference position it would not need to be adjusted thereafter before use.

Therefore, the primary object of the present invention is to provide new and improved gyro caging means.

Another object of the present invention is to provide new and improved means for fixing a rotatable member in a predetermined position and then releasing it.

These and other objects will be apparent from the following specification and figures of which, Fig. 1 is a diagrammatic perspective view of my invention as applied to a conventional gyroscope;

Figure 1:
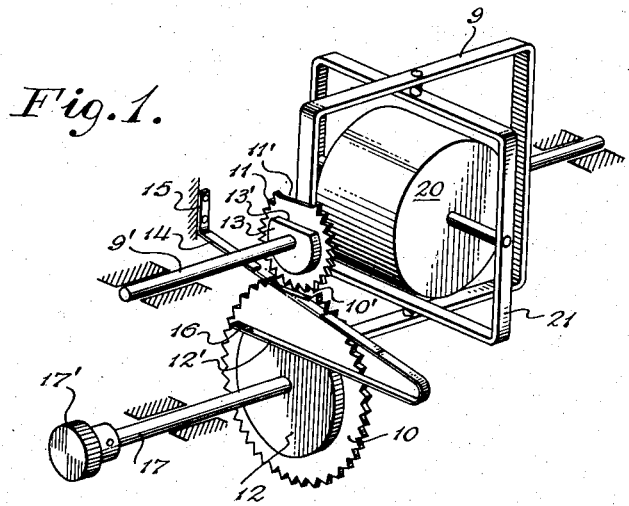

The caging mechanism of this application operates on a spring-detent principle and is illustrated generally in connection with a gyroscope in Fig. 1. It comprises a driving gear 10 mounted on a shaft 17 adjacent the instrument housing (not shown), and a driven or gimbal gear 11 mounted on a trunnion 9' of gimbal or vertical ring 9. The gyro rotor is shown conventionally at 20 as journaled in rotor bearing ring 21 which is mounted for rotation about a normally vertical axis in ring 9. Each gear has suitable curved cutaway portions 10' and 11' for a purpose to be described. Mounted coaxially with driving or spring energizing gear 10 is a driving cam 12, and similarly connected to gimbal gear 11 a gimbal cam 13, each cam having flat portions 12' and 13' respectively. The cams 12 and 13 are mounted on the gears so that the flat portions on the cams are disposed in the same angular position as the cutout portions 10' and 11' on the driving gear and gimbal gear respectively.

Cooperating with the flat portions of the cams is a hairpin-shaped, or U-shaped spring member 14 having its upper arm 14' fixed as at 15 to the gyro housing and the other arm 16 thereof in engagement with the driving cam 12. It will be noted that the fixed end of arm 14', of spring 14 is in substantially the same horizontal plane which includes the flat 13' of cam 13 when the latter is in the "caged" position, as will be discussed.

Figure 2:
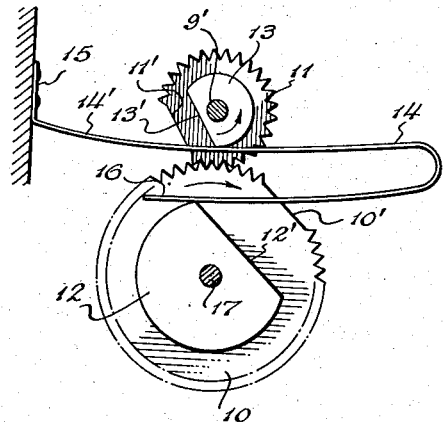
Fig. 2 shows my cage in the initial stage of a caging operation.
Figure 3:
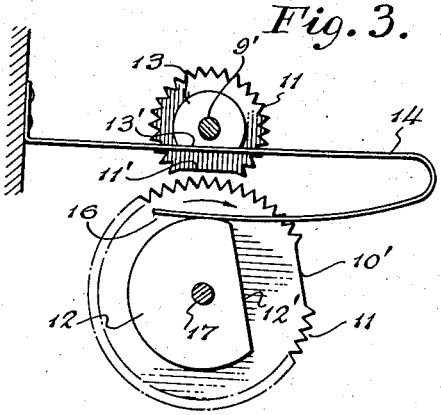
Fig. 3 shows the cage in the caging position.

A typical operation of the caging mechanism will be understood by referring sequentially to Figs. 1, 2, 3 and 4. In Fig. 1, the gyroscope has assumed an undesired upside down position, and is free or uncaged, since the teeth of gears 10 and 11 are not engaged. It is assumed that the operator desires to cage and reset the same. The operator first rotates shaft 17 (Fig. 2) by a knob 17' in either direction (shown as clockwise). As soon as the knob is rotated, the free end 16 of spring 14 is raised off the flat by cam action so that the upper portion 14' of the spring 14 is raised sufficiently to come into contact with the gimbal cam 13, as shown in Fig. 2, applying a brake to the trunnion. Simultaneously, the driving gear 10 comes into mesh with gimbal gear 11. Continued rotation of the shaft 17 will cause the driving gear 10 to rotate the gimbal gear 11 and gimbal cam 13 until the upper portion 14' of the spring 14 nears the flat 13' of the gimbal cam 13 as in Fig. 3. As the teeth of gear 11 leave the teeth of gear 10 the upward thrust of bowed spring 14' will continue to turn trunnion 9' until the flat 13' of cam 13 is parallel to the leaf spring 14', in which position the cam will be held and the gyro caged, the upper portion 14' of the spring 14 being held under tension by the driving cam 12, which will prevent further rotation of the gimbal cam 13, and cut-out 11' of the gimbal gear 11 will allow the driving gear 10 to rotate free of the gyro. This is the caged position.

Figure 4:
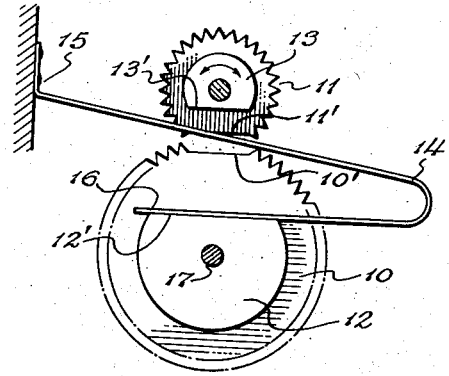
Fig. 4 shows the final released position of the cage, with the gyroscope freed in its correct operating condition.

Driving gear 10 may be rotated further in the same direction or, since gimbal gear 11 is no longer in mesh with driving gear 10, may be rotated in the opposite direction until the flat 12' of the driving cam 12 is in its upper horizontal position. Upon reaching this position the free end 16 of the spring 14 will drop onto the flat portion 12' of the cam 12 thereby lowering the upper portion 14' of the spring 14 until it is out of engagement with the gimbal cam 13; i. e., the driving gear 10, driving cam 12, and spring 14 will be in the position as shown in Fig. 4, and the gimbal gear 13 will remain, under static conditions, in the position illustrated in Fig. 4. This latter position will be the "uncaged" or free operating position with the gimbal centralized or vertical in the right side up position.

The caging mechanism has been disclosed in connection with securing the gyro about one axis. It is understood a second cage may be provided for the other axis.

Means are preferably provided to constrain the spring 14 to its proper plane so it will not ride off the cam surfaces. This may be done by mounting the cams close to the instrument housing or by providing a special plane surface for this purpose. The spring 14 is preferably made of spring steel stiff enough so that the operator can feel the detent action when the spring contacts the flat portions of the cams.

The invention is not limited to the disclosed gyroscope use, but may be used wherever it is desirable to return a rotatable member to a predetermined position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for caging a gyro comprising a gimbal adapted to be rotated about an axis, a first gear fixed to said gimbal said gear having a cutout portion, a first cam connected in fixed relation to said gear said cam having a flat portion, a spring member adapted to contact said cam when under pressure, a second gear connected and adapted to engage said first gear, said second gear having a cutout portion, a second cam with a flat portion connected in fixed relation to siad gear, said second cam being adapted to apply pressure to said spring member.

2. Means for caging a gyro comprising a gimbal adapted to be rotated about an axis, a first gear fixed to said gimbal said gear having a cutout portion, a first cam connected in fixed relation to said gear said cam having a flat portion, a movable member adapted to apply pressure to said cam when actuated, a second driving gear connected and adapted to engage said first gear, said second gear having a cutout portion, a second cam with a flat portion connected in fixed relation to said gear, said second cam being adapted to actuate said movable member, and control means to rotate said second gear.

3. Means for fixing a rotatable member in a predetermined position comprising, a first gear fixed to said member, said gear having a cutout portion, a first cam connected in fixed relation to said gear, said cam having a flat portion having a fixed angular relation to said cutout gear portion, a spring detent member adapted to apply pressure to said cam when actuated, a second gear connected and adapted to engage said first gear, said second gear having a cutout portion, a second cam with a flat portion connected in fixed relation to said gear, said second cam being adapted to actuate said spring detent member.

4. Means for positioning a rotatable member in a predetermined position comprising a first gear attached to said member and having a cutout portion, a cam connected to said gear said cam having a flat portion in fixed relation to the cutout portion of said gear, a spring loaded U-shaped member pivoted at one end and operatively connected to said cam, a second driving gear adapted to rotate said first gear and a cam connected to said driving gear and adapted to actuate said spring loaded member to thereby position said rotatable member in a predetermined manner.

5. A locking and resetting device for a gyroscope having a gimbal comprising a first gear attached to said gimbal at its gimbal axis, cam means connected to said gear, a spring adapted to lock said cam and gimbal in a predetermined position when brought into engagement with said cam, a second gear adapted to rotate said first cam, and actuating means connected to said second gear and adapted to bring said means into engagement with said cam at will.

6. A locking and resetting device for a gyroscope having a gimbal comprising a first gear attached to said gimbal at its gimbal axis and having a cutout portion, a cam connected to said gear, a spring member positioned to engage said cam and lock said gyroscope when energized, a second gear adapted to rotate said first gear except when said cutout portion in said first gear is adjacent the teeth of the second gear, a cam connected to said second gear and adapted to energize said spring to thereby lock said first cam and said gimbal in a predetermined position, and means for rotating said second gear whereby said gimbal may be reset, locked and released in a desired position by rotating said second gear.

7. A locking and resetting device for a gyroscope as claimed in claim 6 wherein said second gear also has a cutout portion which lies adjacent the cutout portion of the first gear during normal operation.

STANLEY P. CLURMAN.

References Cited in the file of this patent
UNITED STATES PATENTS

| Number | Name | Date |
|---|---|---|
| 183,854 | Huntington | Oct. 31, 1876 |
| 727,310 | Dooley | May 5, 1903 |
| 2,001,038 | Reid | May 14, 1935 |
| 2,406,342 | Beach et al. | Aug. 27, 1946 |